March 17, 1936.  G. H. OLSON ET AL  2,033,996
STEERING AND CONTROLLING MECHANISM FOR CRAWLER TREAD VEHICLES
Filed July 29, 1932  5 Sheets-Sheet 1

Inventors
Gustaf H. Olson
Hilmer N. Ekbom
by Parker & Carter
Attorneys

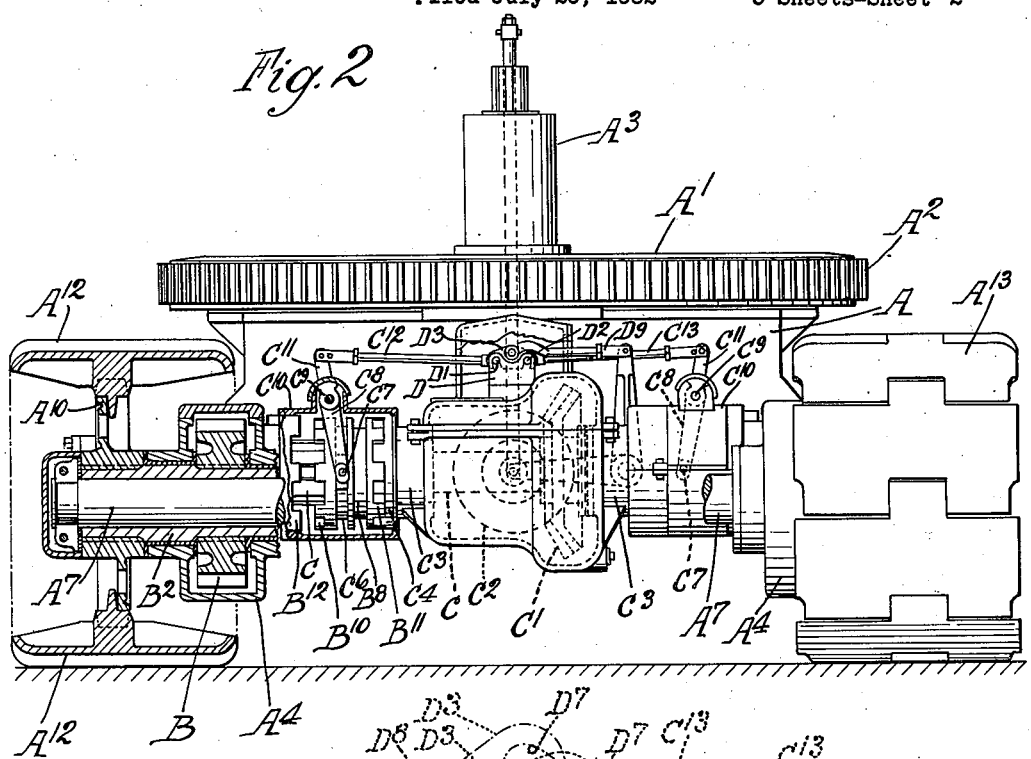
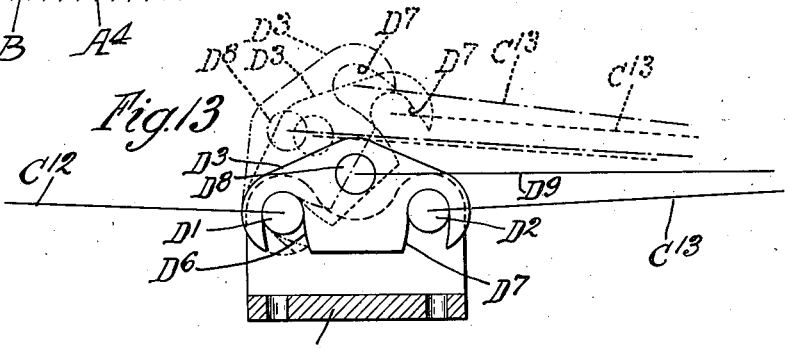
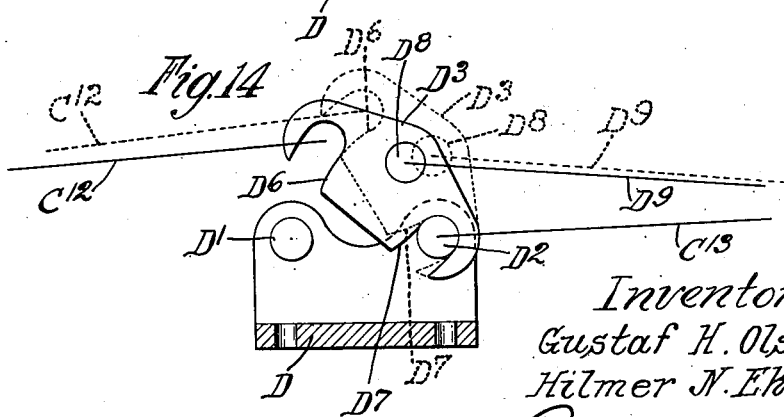

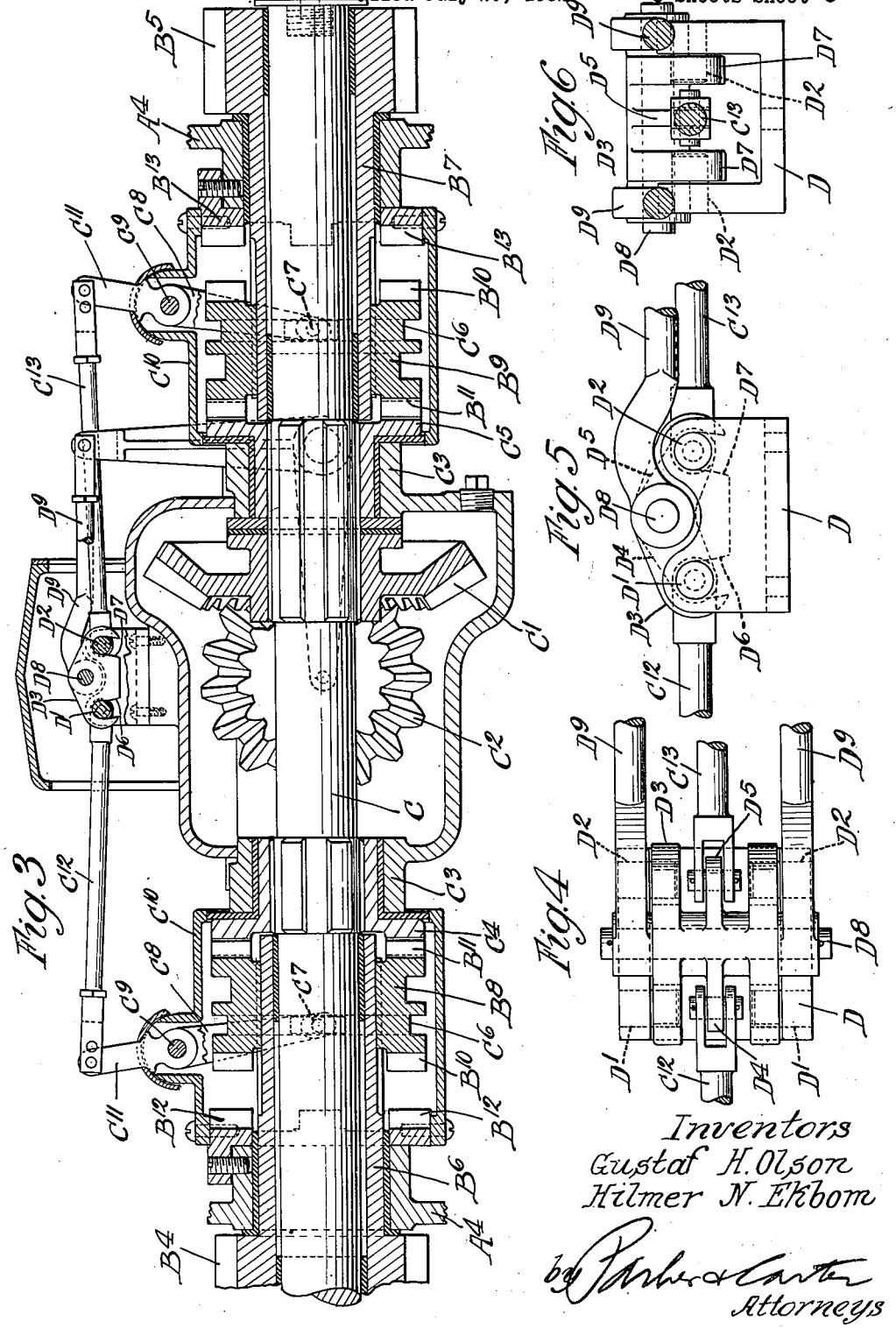

March 17, 1936.  G. H. OLSON ET AL  2,033,996
STEERING AND CONTROLLING MECHANISM FOR CRAWLER TREAD VEHICLES
Filed July 29, 1932  5 Sheets-Sheet 4
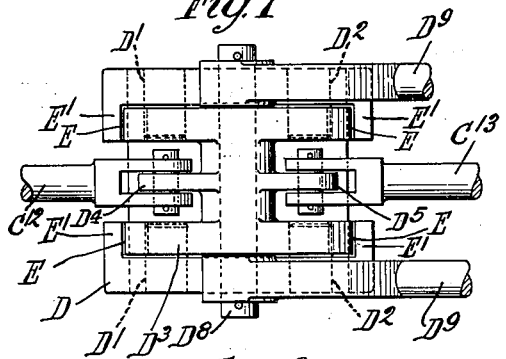
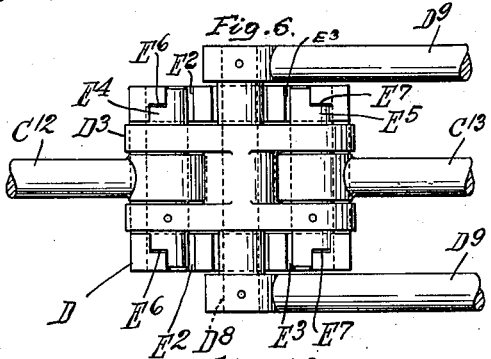
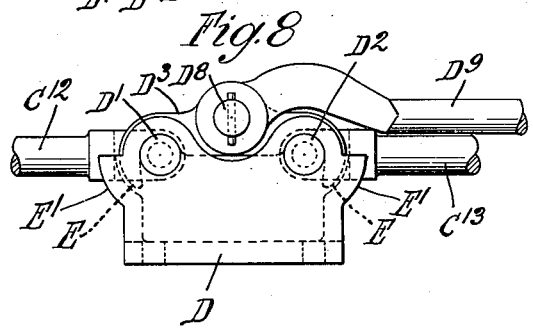
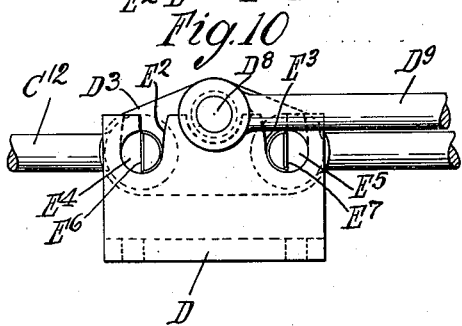
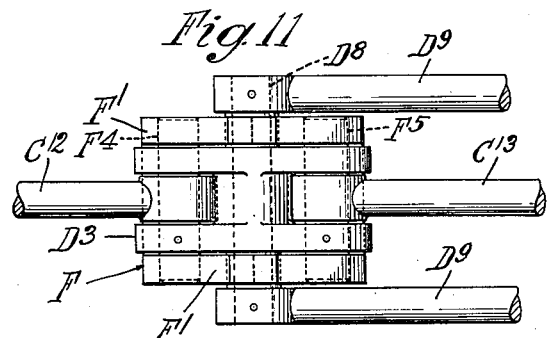
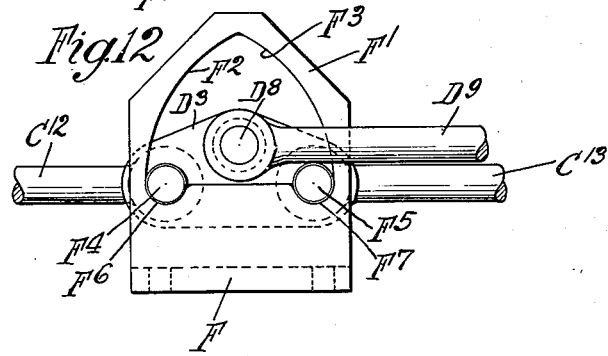
Inventors
Gustaf H. Olson
Hilmer N. Ekbom
by Parker & Carter
Attorneys.

March 17, 1936. G. H. OLSON ET AL 2,033,996
STEERING AND CONTROLLING MECHANISM FOR CRAWLER TREAD VEHICLES
Filed July 29, 1932 5 Sheets-Sheet 5
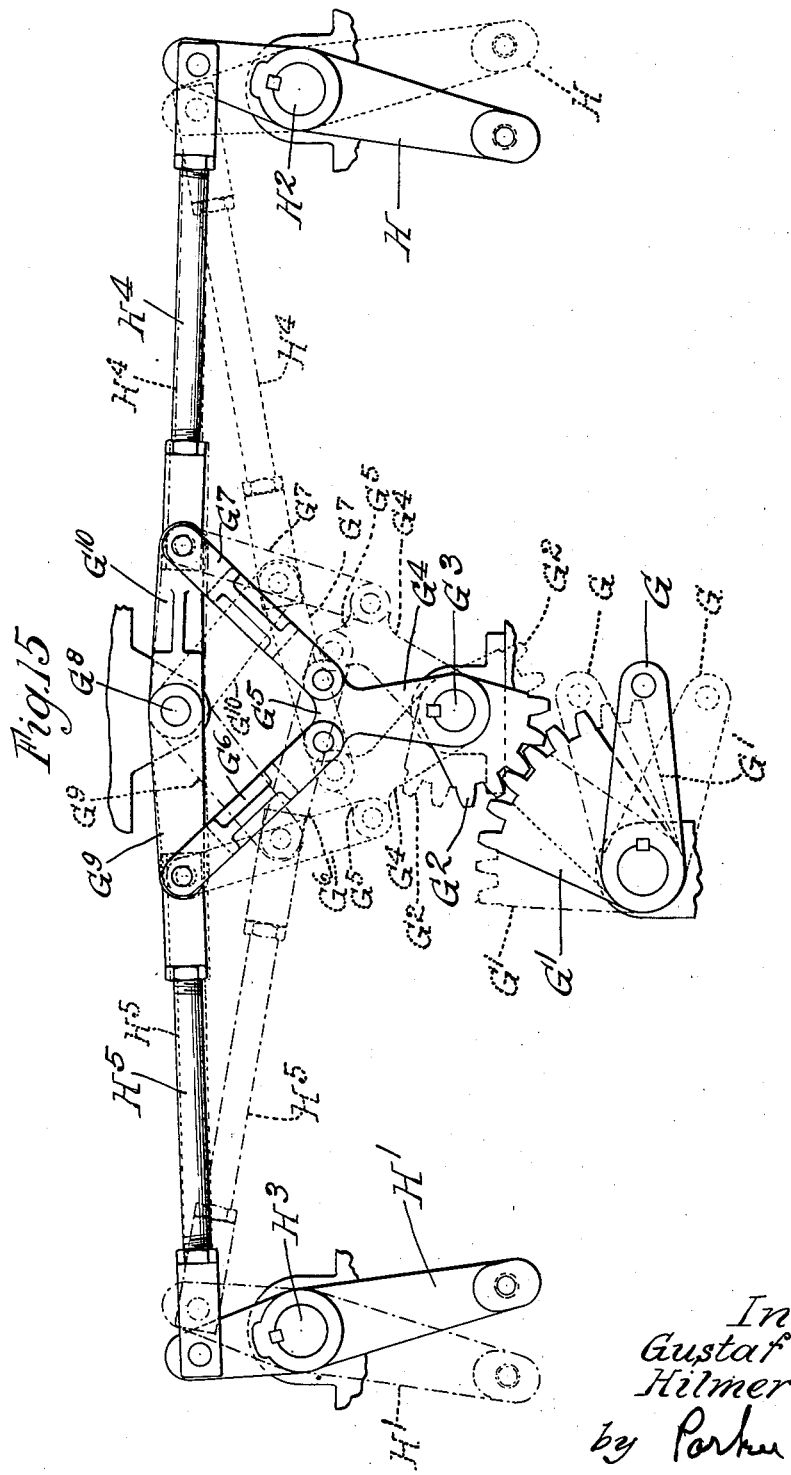
Inventors
Gustaf H. Olson
Hilmer N. Ekbom
by Parker & Carter
Attorneys.

Patented Mar. 17, 1936

2,033,996

UNITED STATES PATENT OFFICE 2,033,996

STEERING AND CONTROLLING MECHANISM FOR CRAWLER TREAD VEHICLES

Gustaf H. Olson and Hilmer N. Ekbom, Chicago, Ill., assignors to Link-Belt Company, Chicago, Ill., a corporation of Illinois Application July 29, 1932, Serial No. 625,804

9 Claims. (Cl. 180—9.2)

Our invention relates to improvements in steering and controlling mechanisms for crawler tread vehicles and while particularly applicable for use in connection with cranes and shovels is of course equally applicable in other circumstances. One object of our invention is to provide means whereby during the steering manipulation and control of the crawler tread vehicle, it is impossible for more than one crawler tread to be at one time disconnected from the motive power. Another object is to provide an interlocking means whereby when one tread is idling or locked, the other tread is always automatically maintained in connection with the engine. Other objects of our invention will appear from time to time throughout the specification and claims.

Crawler tread vehicles habitually comprise a chassis or framework supported on two endless track crawler tread bands, the weight of the vehicle being applied to the side of the band resting on the ground through a number of weight supporting rollers. The crawler tread is driven through any suitable transmission means, power being applied by means of a sprocket normally engaging one end of the open loop formed by the endless track, the other end of the loop traveling over an idler. Clutch means are provided interposed between the prime mover or power source and each of the crawler treads separately whereby for straight ahead forward movement, both crawler treads are simultaneously driven. For gradual turns one crawler tread is disconnected and idles or drifts while the other tread drives and for sharp turns the idle tread is locked against rotation while the other tread drives. Under the intermediate conditions for gradual curves, the frictional resistance to rotation or movement of the idler crawler tread forms a considerable drag on the vehicle and the driven tread moves the vehicle forwardly about a pivot located outside of the vehicle on a comparatively gradual curve. In the last position where the idle tread is locked, the drive of the power tread causes vehicle rotation about a pivot generally intersecting the locked or idle tread.

In manipulating heavy self-propelling vehicles such as shovels and cranes on hills, it is essential that there be always a connection between the power and at least one of the crawler treads as otherwise owing to the great weight of the machinery involved, there is the possibility that if both treads are freed from drive shaft or shafts, there being no adequate control means available, the machine may coast down hill and since owing to the great weight involved, jaw clutches are preferable, it is difficult to force the jaw clutch into control after the apparatus has started to move. We provide, therefore, as the basis of our invention an interlocking means whereby the operator may by a single lever selectively cause engagement of the clutches to drive both the crawler tread or while maintaining engagement of the clutch with one crawler tread, may disengage the other tread to permit it to idle or may engage the clutch with a stationary abutment to lock the idle tread against movement, the interlock being such that in order to disengage the engaged tread, the clutch controlling the idle tread must come back through the neutral to the driving position before the opposed tread can be free.

Our invention is illustrated more or less diagrammatically in the accompanying drawings, wherein—

Figure 2 is an end elevation in part section along the line 2—2 of the device shown in Figure 1;

Figure 3 is a section on an enlarged scale along the line 3—3 of Figure 1;

Figure 1:
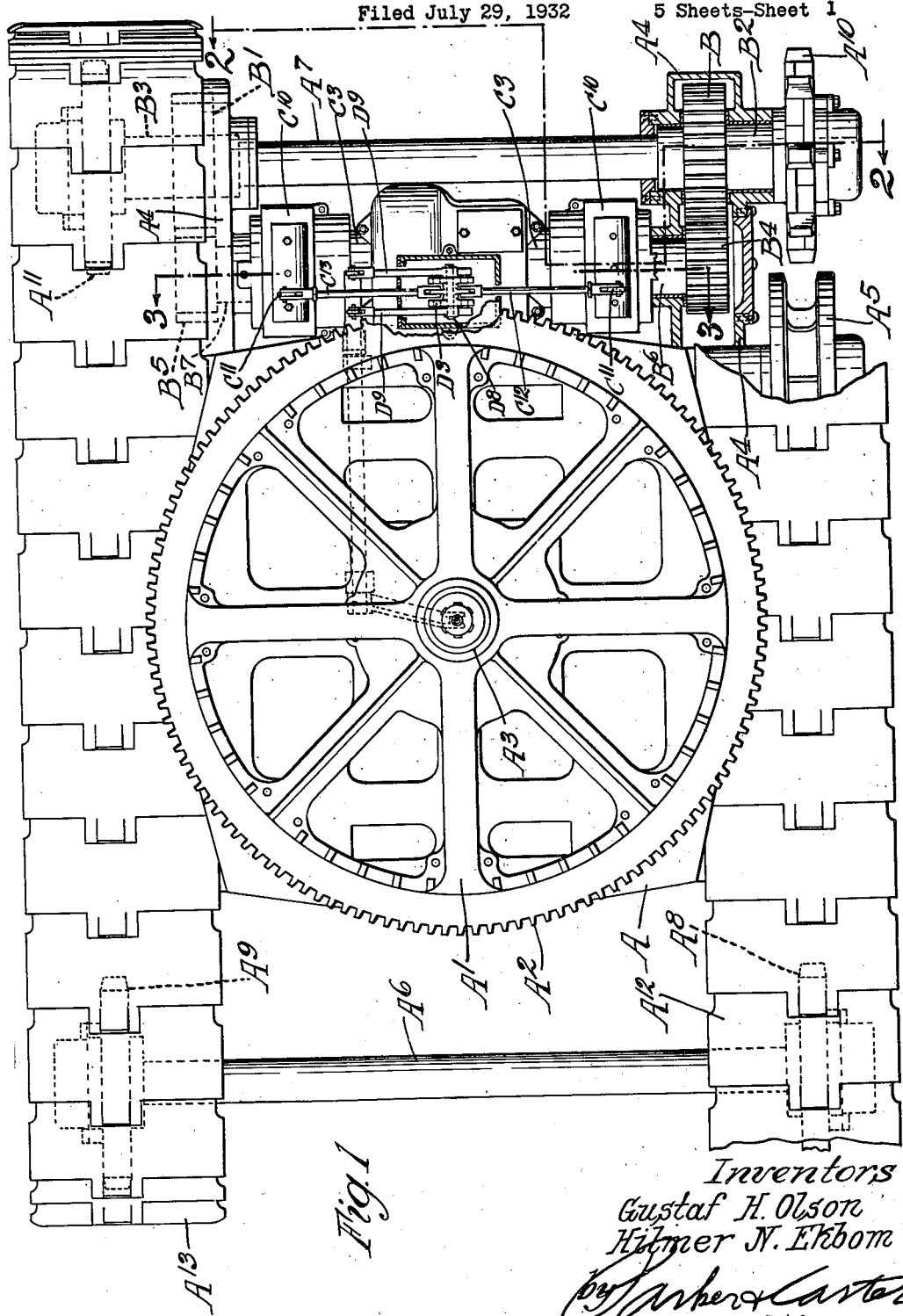
Figure 1 is a plan view in part section of the running gear of a vehicle adapted for use with our invention.

Figures 4, 5 and 6 respectively are plan view, side and end elevation of the preferred form of interlock of our device;

Figures 7 and 8 are respectively plan view and side elevation of a modified form;

Figures 9 and 10 are respectively plan view and side elevation of a further modified form;

Figures 11 and 12 are respectively plan view and side elevation of a further modification;

Figure 13 is a diagrammatic side elevation of the interlock showing position No. 1 where both treads are driven, in full line; position No. 2 where a left hand tread is driven and the right hand tread is free to drift, in dotted lines; position No. 3, where the left hand tread is driven and the right hand tread is locked, in dot and dash line;

Figure 14 shows the interlock, position No. 4 illustrated in full line, where the left hand tread is free to drift and the right hand tread is driving; position No. 5 illustrated in dotted line where the left hand tread is locked and the right hand tread is driving;

Figure 15 shows a plan view of a modified form of the invention.

Like parts are illustrated by like characters throughout the specification and drawings.

A is the vehicle frame. In this instance there is integral with or mounted upon it the roller path A¹ surrounded by the gear A² provided with pivot pin A³ to accommodate the rotating platform of a shovel or excavator, though obviously the frame used might be such as would be appropriate for a tractor or other self-propelled vehicle. Extending downwardly from the frame A are side members A⁴, projecting laterally therefrom a plurality of rollers A⁵ arranged with their axes in a horizontal plane along the frame. These frame members extend longitudinally at both ends beyond the frame A. At each end they carry rigid axles A⁶ A⁷. The axle A⁶ carries idler sprockets A⁸ A⁹ at each end thereof. The axle A⁷ carries driving sprockets A¹⁰ A¹¹ at each end thereof. A¹² A¹³ are two separate endless crawler tread belts traveling about the sprockets A⁸ A¹⁰ A⁹ A¹¹ respectively, which furnish a track along which the rollers A⁵ may travel to support the weight of the vehicle all in a manner well known in connection with crawler tread vehicles.

Each of the sprockets A¹⁰ A¹¹ mounted as they are rotatably on the shaft or axle A⁷ is associated with gears B B¹ by means of the sleeve B² B³ which with the gear and the sprocket is rotatable on the shaft A⁷. Each of these gears B B¹ is in mesh with a driving pinion B⁴ B⁵. The pinions B⁴ B⁵ are respectively an integral part of or mounted on sleeves B⁶ B⁷. Splined on these sleeves are jaw clutch drums B⁸ B⁹ so that the drums may be longitudinally displaced with respect to the sleeve but are held against rotation with respect thereto. These clutch drums have clutch jaws B¹⁰ B¹¹ on either end thereof. Mounted on the side frames A⁴ are fixed clutch jaws B¹² B¹³. When either one of the clutch drums are moved to the outward position the jaws B¹⁰ engage the fixed jaws B¹² B¹³ as the case may be and lock whichever one of the crawler treads is involved radially against movement C is a jack shaft. It carries a bevel gear C¹ in mesh with a bevel pinion C² driven by any suitable connection from a suitable source of power not here illustrated. This jack shaft is held in positive alignment with the sleeves B⁶ B⁷. At either side of the bevel gear C¹ on the jack shaft are clutch jaws C⁴ C⁵, adapted at the will of the operator to be engaged by the clutch jaws B¹¹ on either one or both of the clutch drums. When such engagement takes place, then power is transmitted from the prime mover or motor through the jack shaft through the clutch jaws to the sleeves B⁶ B⁷ and thence to the crawler treads through the pinions B⁴ B⁵. Each of the clutch drums B⁹ B⁸ is provided with an annular groove C⁶. The annular groove C⁶ in each case is engaged by the clutch shifting pins C⁷ on the clutch shifting yokes C⁸, which yokes are pivoted at C⁹ on a part of the vehicle frame C¹⁰ as indicated. Levers C¹¹ extend upwardly from the yokes and there is associated with each lever a drag link C¹² C¹³ whereby the yoke may be rotated to operate the clutch.

D is a latch frame preferably a channel frame having projecting inwardly on both sides and at each end thereof the stub pins D¹ D¹, D² D². D³ is a latch block. It happens to be generally H-shaped and is provided intermediate the two arms of the H with lugs D⁴ D⁵ upon which are respectively pivoted the links C¹² C¹³. Each of the four arms of the H is notched or slotted as indicated at D⁶ D⁷, the notches D⁶ engaging the pins D¹, the notches D⁷ engaging the pins D², passing through the latch block D³ at a point intermediate the notches D⁶ D⁷ and in a plane above the plane of the pins D¹ D² when they engage the notches is a pin D⁸. Pivoted on the two ends of this pin D⁸ are connecting links D⁹ which extend to any suitable power source, for instance, a hand wheel, a lever, a hydraulic plunger or the like for the purpose under the control of the operator of causing manipulation of the latch block. When the parts are in the position shown in Figure 5, Figure 3, Figure 2 and in full line position as shown in Figure 13, they are in what we prefer to call position 1. In this position the two clutch shifting yokes are drawn inwardly to cause engagement of the clutch jaws B¹¹ C⁴ and B¹¹ C⁵ so that the two crawler treads are driven. If pressure is exerted upon the links or connecting rods D⁹, the parts will be caused to assume the dotted line position of Figure 13, that is position No. 2. In this case, there is still engagement between the notches D⁶ and pins D¹. There is no movement of the drag link C¹² and the left hand tread is still driven. However, the drag link C¹³ has been drawn up, the right hand clutch yoke in Figure 3 has been rotated into the neutral position and the right hand crawler tread is free to drift or coast. Still further longitudinal displacement of the links D⁹ will bring the parts shown in dot and dash lines in Figure 13, that is position No. 3 wherein the left hand tread is still driving because there has been no movement of the drag link C¹², the drag link C¹³ has been drawn further over to swing the clutch yoke C⁸ on the right hand clutch drum over until the jaws B¹⁰ B¹³ are in engagement and the right hand crawler tread is locked against movement.

The same situation in effect only reversed appears in Figure 14. Tension applied to the connecting link D⁹ rotating the latch block D³ in a clockwise direction will cause movement from the position shown in Figure 13 in full lines first to the position shown in Figure 14 in full lines and then to the position shown in Figure 14 in dotted lines. During this entire operation the drag link C¹³ remains without movement but link C¹² is first drawn up in position No. 4 to disengage the left hand clutch and then further drawn up to lock the left hand clutch to prevent movement of the crawler tread. By this arrangement, while it is possible to have both treads driven at the same time, it is manifestly impossible to have both treads disconnected at the same time. One tread is always connected to the motor or engine, the other tread may be free to float or may be locked against displacement.

In the modified form shown in Figures 7 and 8 instead of using slots or notches to insure that one or the other end of the latch block will always be in fixed position, a cam or tongue arrangement is used. Longitudinal movement of the cam or tongue E is prevented by lugs E¹ and as the latch block rotates in either direction, this cam or tongue comes under the pins whereby vertical displacement is prevented. In Figures 9 and 10, slots E² E³ are cut in the frame. These slots are associated with pins E⁴ E⁵ mounted in the latch block which pins are notched at their ends as indicated at E⁶ E⁷ to interlock with the slots E² E³. As the latch block is tilted about one of the pins E⁴ or E⁵ thereby shifting one of the clutches the opposite pin becomes interlocked by means of the pin projections and slots.

In the further modified form shown in Figures 11 and 12, the latch frame F is still a channel. The arms of the channel are much higher and terminated in side plates F¹ containing two opposed inclined cam surfaces F² F³ formed in apertures in the walls $F^1$. The pins $F^4$ $F^5$ on the latch block when in the driving position engage semi-cylindrical sockets $F^6$ $F^7$ and either pin can travel about its seat in its respective socket running along the cam surfaces $F^2$ $F^3$ but neither pin can rotate about the other unless the other is in the driving position, thus insuring that only one of the clutches may be disengaged at a time just as in the other forms of latch.

In the modified form shown in Figure 15, G is a steering rod. It actuates a steering quadrant $G^1$ in mesh with a quadrant $G^2$ on the clutch shaft $G^3$. On the clutch shaft is a clutch throw out arm $G^4$ forked as at $G^5$. Clutch links $G^6$ and $G^7$ are each pivoted on one of the forks $G^5$ of the clutch arm $G^4$. $G^8$ is an abutment pin. It is so positioned that in the neutral position with both clutches in engagement, a line joining the centers of abutment $G^8$ and the clutch shaft $G^3$ coincides with the central axis of the clutch arm $G^4$ and is equidistant from the pivot points of the links $G^6$ $G^7$ on the fork $G^5$. $G^9$ $G^{10}$ are links pivoted on the abutment $G^8$ and also in pivot relation with the free ends respectively of the links $G^6$ and $G^7$.

H is the right hand clutch lever. $H^1$ is the left hand clutch lever. These levers are pivoted on pins $H^2$ $H^3$ and are respectively associated with the right hand and left hand clutches not shown in this particular drawing because in all essential elements they are the same as the clutches shown in Figure 2. $H^4$ $H^5$ are drag links. Each is pivoted at one end on the short end of the clutch lever $H^1$ H respectively. At the other end, each drag link is respectively in pivotal relation with the links $G^6$ $G^9$ and $G^7$ $G^{10}$. When the parts are in the position shown in full lines, both clutches are in engagement. If the clutch controlling member $G^4$ is thrown to the left into the dotted line position, the link $G^6$ swings to the left causing a slight upward movement of the combined pivot point of the links $H^5$ $G^9$ and $G^6$ which is not sufficient to cause any clutch controlling operation of the lever $H^1$ but the link $G^7$ is drawn down into general parallelism with the drag link $H^4$, the link $G^{10}$ swinging around the pivot $G^8$ as indicated and the clutch lever H is thrown to the right to disengage the right hand clutch and drive is then through the left hand clutch only. When the steering rod is moved in the opposite direction, the parts pass back through the neutral position engaging both clutches and then to the position shown in dash lines where the left hand clutch is disengaged and the right hand clutch remains in engagement. In this case as in the other cases, it is impossible to ever so manipulate the device that both clutches are out of engagement at the same time, so the operator always has control over the machine through one clutch and he can only disengage one clutch at a time and if he wants to disengage the other one, he has to first engage both so that disengagement of either clutch only can take place from a position where both clutches are engaged.

We claim:

1. In combination two control members adapted to be placed in a plurality of different operating positions, a single actuating member, connection means between said actuating member and each of the control members, a single interlocking member associated with the actuating member and adapted to positively lock the connection, means of either one of the control members in one position when the actuating member moves the other control member to a different position.

2. In combination, a driving member, two driven members, clutch means interposed between the driving member and each of the driven members and movable to driving, neutral, and locking positions, each of said clutch means including means for connecting the driving member with a driven member when the respective clutches are in driving position, means associated with each of said clutch means for locking the driven member against movement when the respective clutches are in locking position, an actuating member, a connection means between said actuating member and each of said clutch means, means for manipulating the actuating member to move the clutch means into either of said positions and a single interlocking member associated with the actuating member and adapted to positively lock either of said connection means when the respective clutch means is in driving position when the other clutch means is moved by said actuating member into neutral position or locking position.

3. In combination, a driving member, two driven members, a single clutch interposed between the driving member and each of the driven members, means associated with the clutch for connecting the driving member with the driven member, means associated with the clutch for locking the driven member against movement, an actuating member, a connection between it and each clutch, means for manipulating the actuating member to move the clutches into their various positions and interlocking means associated with the actuating member whereby when one clutch is moved by the actuating member into the neutral or driven member locking position the other clutch is positively locked in the driving position, the actuating member comprising a rotating element, a pair of pivot pins associated therewith, means on the rotating element adapted to interlock with said pins whereby rotation of the actuating member about one such pin to disengage it from the other pin automatically locks the member in relation to the pin about which it is rotating.

4. In combination, a driving member, two driven members, a clutch interposed between the driving member and each of the driven members, means associated with the clutch for connecting the driving member with the driven member, means associated with the clutch for locking the driven member against movement, an actuating member, a connection between it and each clutch, means for manipulating the actuating member to move the clutches into their various positions and interlocking means associated with the actuating member whereby when one clutch is moved by the actuating member into the neutral or driven member locking position the other clutch is positively locked in the driving position, the actuating member comprising a rotating element, a pair of pivot pins associated therewith, means on the rotating element adapted to interlock with said pins whereby rotation of the actuating member about one such pin to disengage it from the other pin automatically locks the member in relation to the pin about which it is rotating, the actuating member when in engagement with both pins being adapted to hold both clutches in the driving position.

5. In an excavating machine, endless belt crawler treads on opposed sides thereof, means for driving them, sliding clutches one associated with each endless belt and interposed between it and the driving means, means for operating the sliding clutches comprising a fixed frame, pivot pins mounted thereon, a movable block slotted to interlock said pivot pins, connecting members between the movable block and each clutch, means for rocking the movable block about either one of the pins whereby rocking movement causes movement of one only of the clutches.

6. In an excavating machine of the endless belt crawler tread type, driving means and clutches interposed between the driving means and each of the crawler treads, a rockable actuating member, connections between it and each clutch, a fixed support associated with the actuating member, pivot pins carried by the support upon which the interlocking member may rock, connections between the rocking member and each clutch whereby rocking movement about one pin causes movement of one clutch, rocking movement about the other pin causes movement of the other clutch.

7. In an excavating machine of the endless belt crawler tread type, driving means and clutches interposed between the driving means and each of the crawler treads, a rockable actuating member, connections between it and each clutch, a fixed support associated with the actuating member, pivot pins upon which the interlocking member may rock, connections between the rocking member and each clutch whereby rocking movement about one pin causes movement of one clutch, rocking movement about the other pin causes movement of the other, the interlocking means being adapted to prevent simultaneous disengagement of the actuating member from more than one of the pivot pins.

8. In combination, a power source, two clutches adapted to be driven thereby, driving members associated one with each clutch, an actuating member, connections between it and each clutch, a stationary frame in which the actuating member is mounted, a plurality of hooked cams interposed between the stationary frame and the actuating member whereby the actuating member may be rocked about either of two axes selectively to cause clutch operation, the cam portion about which the member is rocked interlocking therewith to prevent displacement of the cam engaging pivot portion after rocking movement has commenced until the actuating member has rocked back into simultaneous engagement with both cams.

9. In a self-propelled vehicle, a pair of separate ground contacting driving members, power means therefor, a separate clutch for each driving member adapted when in one position to lock the said member against movement, when in another position to release it, and when in a third position to connect it to the power means, a single control means for both said clutches and a single interlocking member associated therewith adapted automatically to hold one clutch in the driving position whenever the other clutch is in either the locking or the release position, such interlocking member being also the sole connection member between the single control means and the separate control means leading to each clutch.

GUSTAF H. OLSON.
HILMER N. EKBOM.